US008099770B2

(12) United States Patent
Makkinejad

(10) Patent No.: US 8,099,770 B2
(45) Date of Patent: Jan. 17, 2012

(54) APPARATUS, AND AN ASSOCIATED METHODOLOGY, FOR FACILITATING AUTHENTICATION USING A DIGITAL MUSIC AUTHENTICATION TOKEN

(75) Inventor: Babak Makkinejad, Troy, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 819 days.

(21) Appl. No.: 12/022,952

(22) Filed: Jan. 30, 2008

(65) Prior Publication Data

US 2009/0193510 A1 Jul. 30, 2009

(51) Int. Cl.
*G06F 7/04* (2006.01)

(52) U.S. Cl. .................. 726/9; 726/26; 726/28; 726/29; 726/30; 713/165; 713/168; 713/189

(58) Field of Classification Search ........................ None
See application file for complete search history.

(56) References Cited

U.S. PATENT DOCUMENTS

| | | | | |
|---|---|---|---|---|
| 7,310,629 | B1 * | 12/2007 | Mendelson et al. | 1/1 |
| 2002/0169721 | A1 | 11/2002 | Cooley et al. | |
| 2004/0030934 | A1 | 2/2004 | Mizoguchi et al. | |
| 2004/0133789 | A1 * | 7/2004 | Gantman et al. | 713/189 |
| 2005/0033579 | A1 | 2/2005 | Bocko et al. | |
| 2005/0060578 | A1 * | 3/2005 | Xue | 713/201 |
| 2007/0189533 | A1 * | 8/2007 | Rhoads | 380/247 |

FOREIGN PATENT DOCUMENTS

JP 2007-208388 A 8/2007

* cited by examiner

*Primary Examiner* — Kaveh Abrishamkar

(57) ABSTRACT

An apparatus, and an associated methodology, for facilitating authentication of a user device to access content at another device. A music file is selected as digital music authentication token. Once selected, authentication data is encoded into the music file. Subsequently, when log-in and authentication procedures are performed, the music file is retrieved, and used pursuant to the authentication procedure.

19 Claims, 3 Drawing Sheets

APPARATUS, AND AN ASSOCIATED METHODOLOGY, FOR FACILITATING AUTHENTICATION USING A DIGITAL MUSIC AUTHENTICATION TOKEN

The present invention relates generally to a manner by which to facilitate authentication of a user device to access a computer system. More particularly, the present invention relates to an apparatus, and an associated methodology, by which to use a digital music token to authenticate a user device that requests access to a computer system.

Pursuant to log-in procedures, a user need not memorize a lengthy personal identification number or password, commonly used for personal identification purposes. Rather, the user need only remember the name, or other identifying indicia, of the music content that has been selected as the digital music authentication token. Authentication information is encoded into the music content and used pursuant to authentication of the user device.

BACKGROUND OF THE INVENTION

The use of computers to perform many varied functions is widespread throughout modern society. Their use, for instance, for purposes of data storage and manipulation is regularly essential to carry out many business, and other, activities. And, with advancements in computer technologies regularly providing for increases in computer storage capacities and computer processing speeds, all at lower costs, increased usage of computers to perform yet more functions is likely. Groups of computers are regularly connected together in networks that provide for communication of data between computer devices that form logical nodes of the networks.

Interconnected computers in a business, or other, enterprise are sometimes referred to as a Local Area Networks (LANs). And, groups of Local Area Networks are sometimes interconnected with remotely-positioned computer devices by way of the public, or other network, connections. The Internet is exemplary of a public network that provides for communication connectivity between remotely positioned computer devices. Many informational and communication services are provided use of an Internet-connected computer device that sends and receives data with a remotely-positioned computer device. Sometimes, the remote computer device permits access to data stored thereat without limitation. Other times, access to the computer device is limited. That is to say, universal access is not provided; rather, access to the stored contents of a computer device is limited to only limited numbers of users. To gain access to the stored contents of a computer device, the device requesting access must identify itself, or its user, as a party that is permitted such access.

Oftentimes, the authorization procedure forms a two-step process. Both identification procedures and then authentication procedures are carried out. An identification procedure pertains to a procedure by which a user informs a remote computer device of the user's identity, e.g., by way of submission of a user name. The identification procedure is typically a relatively simple procedure based upon the sending of a user name or user ID (Identification). In the case of a system or process, identification is usually based upon, e.g., a computer name, a Medium Access Control (MAC) address, an Internet Protocol (IP) address, or a Process ID (PID). Irrespective of upon what the identification is based, the identification generally must uniquely identify the user, does not identify the user's organizational position or other indication of relative importance, and generally avoids using common or shared user accounts, such as ROOT, ADMIN, or SYSADMIN.

An authentication procedure is performed to verify the claimed identity of a user. A user's claimed identity is verified, e.g., by comparing an entered password to a stored password, stored in a system and associated with, or otherwise indexed together with, a given user name. An authentication procedure is typically based upon at least one of four factors. First, authentication is sometimes based upon a value that is known by a user, such as a password or Personal Identification Number (PIN). When a password or Personal Identification Number is used pursuant to authentication, an assumption must be made, that only the authorized party knows the password or Personal Identification Number. Sometimes, a token, such as that provided on a SMART card, is used. When a token is used pursuant to authentication, an assumption is analogously made that only an authorized party has the token or smart card needed to authenticate the identity of the user attempting access. Sometimes fingerprint, voice, retina, iris, or other characteristic information of the user is used pursuant to authentication procedures. And, sometimes, the authentication procedure requires the request that is made to be position-dependent, using, e.g., GPS (Global Positioning System)—based information.

When the authentication procedure requires a password, or other personal identification number to be used, the password must be of characteristics that make unauthorized determination of the password, such as by a brute force method, to be difficult. The password, oftentimes, therefore, is of an inconveniently lengthy configuration, sometimes combining both a PIN and a password. While passwords and Personal Identification Numbers, used in combination with other authentication procedures reduces the possibility of successfully accessing a computer by an unauthorized party, sometimes use of such additional procedures is unavailable or not permitted for any of various reasons.

Existing authentication procedures that require the use of lengthy passwords or Personal Identification Numbers is therefore sometimes unwieldy. An improved manner by which to provide for authentication of a requester requesting access to a computer device that does not require the memorization of a lengthy password would therefore be advantageous.

It is in light of this background information related to identification and authentication procedures that the significant improvements of the present invention have evolved.

SUMMARY OF THE INVENTION

The present invention, accordingly, advantageously provides an apparatus, and an associated method, by which to facilitate authentication of a user device to access a computer system.

Through operation of an embodiment of the present invention, a manner is provided by which to use a digital music token to authenticate a user that requests access to a computer system.

In one aspect of the present invention, a user selects digital music content, such as an .MP3-formatted music file, to form the digital music token. The selected musical content is encoded with authentication information by a steganography encryption technique. The user need not memorize a lengthy password or personal identification number. The user need only remember the music content that has been selected to be used as the digital music token. The user is generally more readily cognizant of the music identity of the selected musical content than of a lengthy password or personal ID.

In another aspect of the present invention, a memory element is provided that stores musical content. The memory element comprises, for instance, a portable music player, connectable to a computer work station or embodied at the computer work station. Musical content, such as an .MP3 music file is stored at the memory element. In a typical configuration, a plurality of music files are stored at the memory element, and a selected one of the music files is selected to form a digital music token. While the music file typically forms an entire music selection, i.e., song or other entertainment, the musical content, if desired, is of a lesser duration, such as a brief segment of a song.

In another aspect of the present invention, a user selects the musical content that is to form the digital music token. The selection is made, e.g., in response to a prompt that prompts the user of the computer device to create, or update, the digital music token. The prompt, in one implementation, is generated by execution of an algorithm whose running is initiated by the user. In one scenario, the prompting is a multi-step prompt. As just mentioned, the user is first prompted to create or update the digital music token. The user first selects a music-style, e.g., classical, jazz, country, rock, etc. And, responsive to the user selection of the music-type, an additional prompt is generated, requesting entry of the name of an artist, composer, or group. Then, responsive to user entry of a selected group, composer, or artist, an additional prompt is generated prompting the user to select a particular album authored by the selected author. The user is then prompted, responsive to a selection of the specific album, the user is prompted to select a musical tract from the selected album. And, if a music file has previously been encoded to include authentication data, the user first decides, such as responsive to the prompt, whether to use such existing digital music token or to create a new token.

In another aspect of the present invention, once the musical content has been selected, steganographic encryption is performed upon the selected musical content. In such a process, authentication data is encoded into the musical content. Authentication data is of characteristics that are not audibly perceptible by human hearing. Thereby, the musical content continues to be playable without apparent alteration for entertainment purposes while also providing a digital music token that includes authentication data. In one implementation, the encoding is performed at the computer device operated by the user, i.e., the encryption is performed 'locally'. In another implementation, the selected music file is sent elsewhere, such as to a network authentication server, and the encoding is performed there. And, once encoded, the resultant digital music token is returned to the computer device for subsequent use.

In another aspect of the present invention, the digital music token is utilized pursuant to a request for access by a computer device to access another computer device, such as the computer device of a computer system positioned remote from the requesting computer device, interconnected by way of a communication channel, such as that provided by the Internet. Pursuant to the request, a user of the requesting computer device requests access to the computer system first by causing entry of, and sending of, identification information, such as a user ID, or log in name. Responsive to delivery of the user's identification and acceptance thereof, the authentication information is caused, either automatically or responsive to a prompt, to be provided to the computer system. Once sent, the requesting computer station is permitted access to the computer station if the is authentication is successful.

In another aspect of the present invention, the computer system is configured to detect the digital music token and to ascertain the authentication data contained therein. And, an authenticator is provided that authenticates the identity of the requestor in the event that the authentication data is of characteristics that authenticates the requestor. An access grantor grants access to the computer system by the requesting computer station if the authenticator authenticates the requestor.

The authentication information is encoded into musical content that is more readily remembered by the requestor than a lengthy password, and, when needed, the digital music token is easily reselected with alternate musical content.

In these and other aspects, therefore, an apparatus, and an associated method, is provided for facilitating authentication of a user device pursuant to a computer-system access request. A memory element is connectable to the musical device and is configured to store musical content that defines a digital music token. A user-device transmitter is configured to transmit the digital music token as part of the computer-system access request. An access grant detector is configured to detect an access grant responsive to the computer-system access request that includes the digital music token.

A more complete appreciation of the scope of the present invention and the manner in which it achieves the above-noted and other improvements can be obtained by reference to the following detailed description of presently preferred embodiments taken in connection with the accompanying drawings which are briefly summarized below, and by reference to the appended claims.

DETAILED DESCRIPTION

Figure 1:
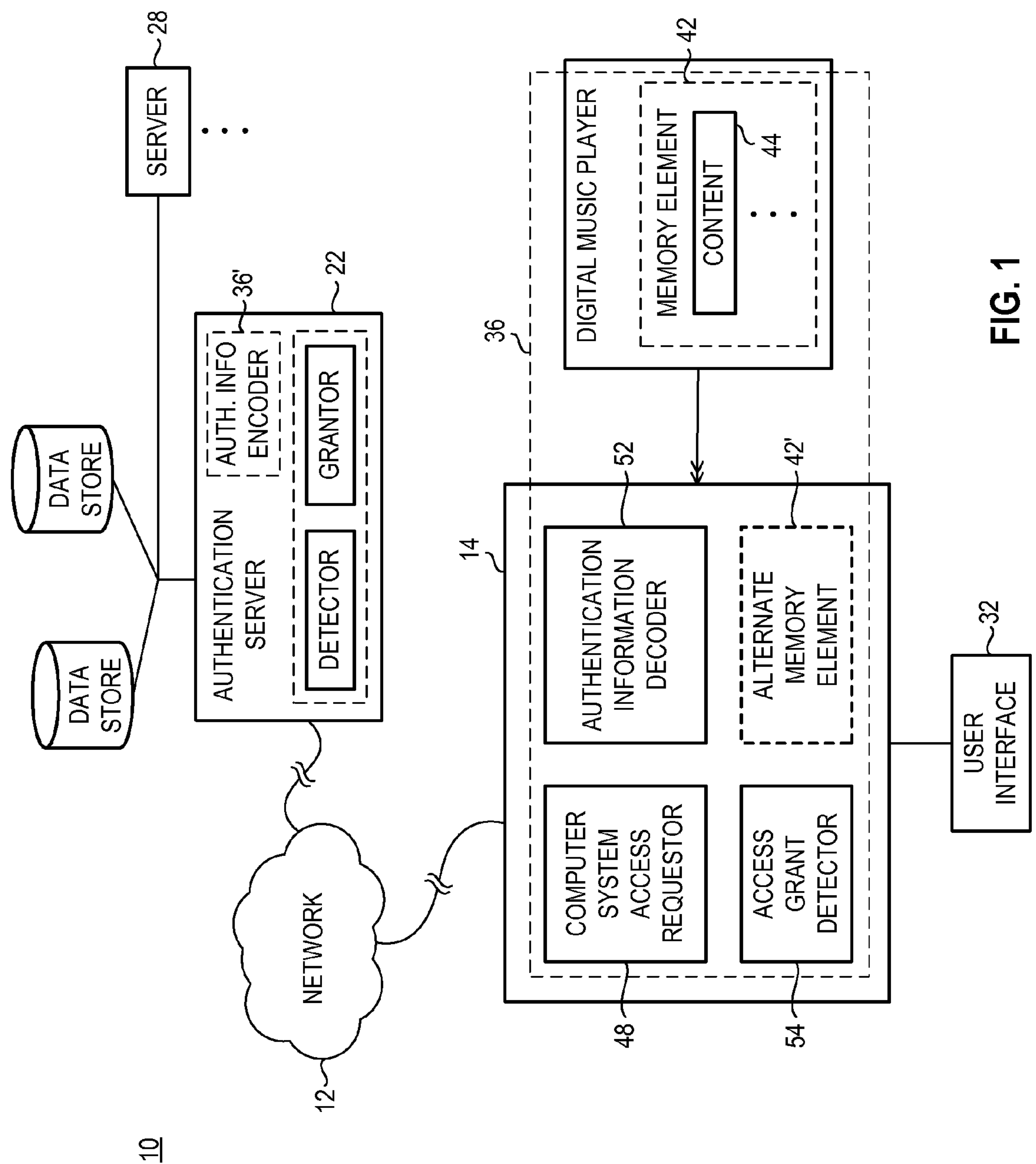
FIG. 1 illustrates a functional block diagram of an arrangement of computer devices that includes an embodiment of the present invention.

Referring first to FIG. 1, an arrangement, shown generally at 10, of computers provides for the communication of data therebetween by way of a network 12. In the exemplary implementation, the network 12 comprises a public network, such as the Internet. In other implementations, the network 12 is representative of other types of networks, including, for instance, a Local Area Network (LAN) or a combination of more than one network, such as a combination of both a Local Area Network and a Wide Area Network (WAN). In whatsoever configuration, the network 12 provides for communication connectivity between individual ones of the computers.

In the illustrated arrangement, a computer workstation 14, such as a Personal Computer (PC) is connected to the network 12. While implemented as a computer workstation, the device 14 is more generally representative of any of variously-configured computer devices that are connectable to a network and to communicate therethrough with another device.

A computer system 18 is also connected to the network 12 in communication connectivity therewith. The system 18, in the exemplary implementation, includes an authentication server 22 that is capable of accessing, or is configured to include, data stores 24 and 26. The system further includes additional servers 28, or other computer devices, that also store data or perform other server operations, including conventional server operations. More generally, the computer system 18 is representative of any computer device, or collection of devices, connectable to the network 12 and permitting of limited access to data maintained thereat or otherwise permitting of communication of data pursuant to performance of a computer, or other communication, service.

Here, the computer device 14 is permitted to access a server 28 upon grant of access thereto. Access is granted to the computer device to access a server 28 if the computer device is properly identified or authenticated as a device that should be permitted access to the server. And, as also noted previously, identification and authentication procedures are regularly used by which to identify a computer device and to authenticate its identity. Conventional procedures typically require a user of the computer device to remember and to enter a lengthy string of alphanumeric characters by way of a user interface 32 of the computer device. The string of alphanumeric characters is used pursuant to the log-in and authentication procedures. The lengthy alphanumeric sequence must be memorized by the user of the computer device or, if written, must be available to the user of the computer device to enter the sequence, when required, pursuant to the log-in and authentication procedures. The user might forget the memorized sequence, or not have the written sequence available when needed.

In accordance with an embodiment of the present invention, an apparatus 36 is provided to facilitate the authentication of the computer device 14 to access another device, here, e.g., the server 28. The apparatus is formed of functional elements, implementable in any desired manner, including, for instance, algorithms executable by processing circuitry.

In the exemplary implementation, the apparatus includes a memory element 42 that is of a memory capacity to store music, or other content, files. The memory element 42, in the exemplary implementation, is embodied at a portable, digital music player, and the content files comprise .MP3-formatted music files. And, the portable digital music player is connected to the computer device, such as by way of a USB (Universal Serial Bus) port. In an alternate implementation, the memory element is formed elsewhere, such as part of the internal memory of the computer device, indicated by the memory element 42' and/or includes additional, or other, types of content files. And, in another implementation, the music, or other content, files are stored at the data store 24, available for downloading to the computer device.

The apparatus 36 further includes a computer system access requestor 48 formed of a user-device transmitter, an authentication information encoder 52, and an access grant detector 54. The apparatus operates pursuant to log-in and authentication operations to access data stored at, e.g., the server 28 or to perform other operations therewith, such as performance of a communication service or other computer-data-related service.

In contrast to conventional log-in and authentication procedures that require the user to enter a lengthy alphanumeric string of characters, pursuant to an embodiment of the present invention, the user need only remember the title, or other identification of, a file 44 in which authentication data is encoded, in inaudible form. The content, or the encoded portion thereof, is communicated pursuant to the log-in and authentication procedures carried out to identify and authenticate the computer device 14.

A user of the computer device is able to select the content into which the authentication information is to be encoded. The user, through interaction with the user interface, selects, or is prompted to select a content file, and the user, through appropriate input actuation of the user interface, selects a content file to be used pursuant to authentication procedures. Upon selection of the file, the authentication information encoder 52 operates to encode authentication information into the selected file. The encoding is performed through use of steganographic encryption techniques. The authentication information encoded into the content is humanly imperceptible, that is to say, not audible to human ears. And, the content, once the authentication information has been encoded, is stored, subsequently retrievable pursuant to log-in and authentication procedures.

When the user of the computer device subsequently elects to communicate with another device, here, e.g., the server 28, the computer system access requestor 48 of the user-device transmitter generates a request for access to communicate with the other device. The request comprises, for instance, a two-step signaling procedure in which log-in information is first sent and then authentication information is sent. Single-step and multi-step log-in and authentication procedures are carried out in other implementations. In the exemplary two-step procedure, log-in information is caused to be sent by the computer system access requester from the computer device 14 to the authentication server 22. And, signaling between the devices ensues pursuant to authentication of the computer device. Namely, the user of the computer device retrieves the selected content 44 into which the authentication information has been encoded to form the digital music token and causes the selected content, or at least the encoded information therein to be sent to the authentication server. The authentication server contains apparatus 58 that includes an authentication token detector 68 that detects delivery of the content, or at least the authentication information that is encoded into the content. And, responsive thereto, an access grant detector 72 makes a decision as to whether to grant access to the communication device to access the server 28, or other appropriate device. The identification and authentication performed by the authentication server makes use of data retrieved from the data store 24 and the data store 26. The access grant generator 72 that generates an access grant message, or access denial message, that is returned to the communication device 14. And, the message, once delivered to the computer device is detected by the access grant detector 54. Responsive to the contents of the received message, the user of the computer device is capable of taking further action. If access is granted, retrieval, or exchange, of data with the server 28, or other appropriate device whose access has been granted, ensues.

In an alternate implementation, the functions provided by the authentication information encoder are carried out at the authentication server, here indicated by the block 52', or elsewhere, remote from the computer device 14. In this alternate implementation, the selected content 44 is sent from the computer device to the authentication server 22, and the encoder 52' encodes the authentication information therein. And, the resultant digital music token is returned to the computer device and stored at the memory element 42 or 42', available for subsequent use as above-described.

And, in another implementation in which the music file is stored at the data store 24, the user selects the music file, from the data store, the authentication data is encoded therein and the resultant token is downloaded to the computer device. Or, once the file is selected, the file is downloaded, and the authentication data is encoded into the file, once downloaded.

Figure 2:
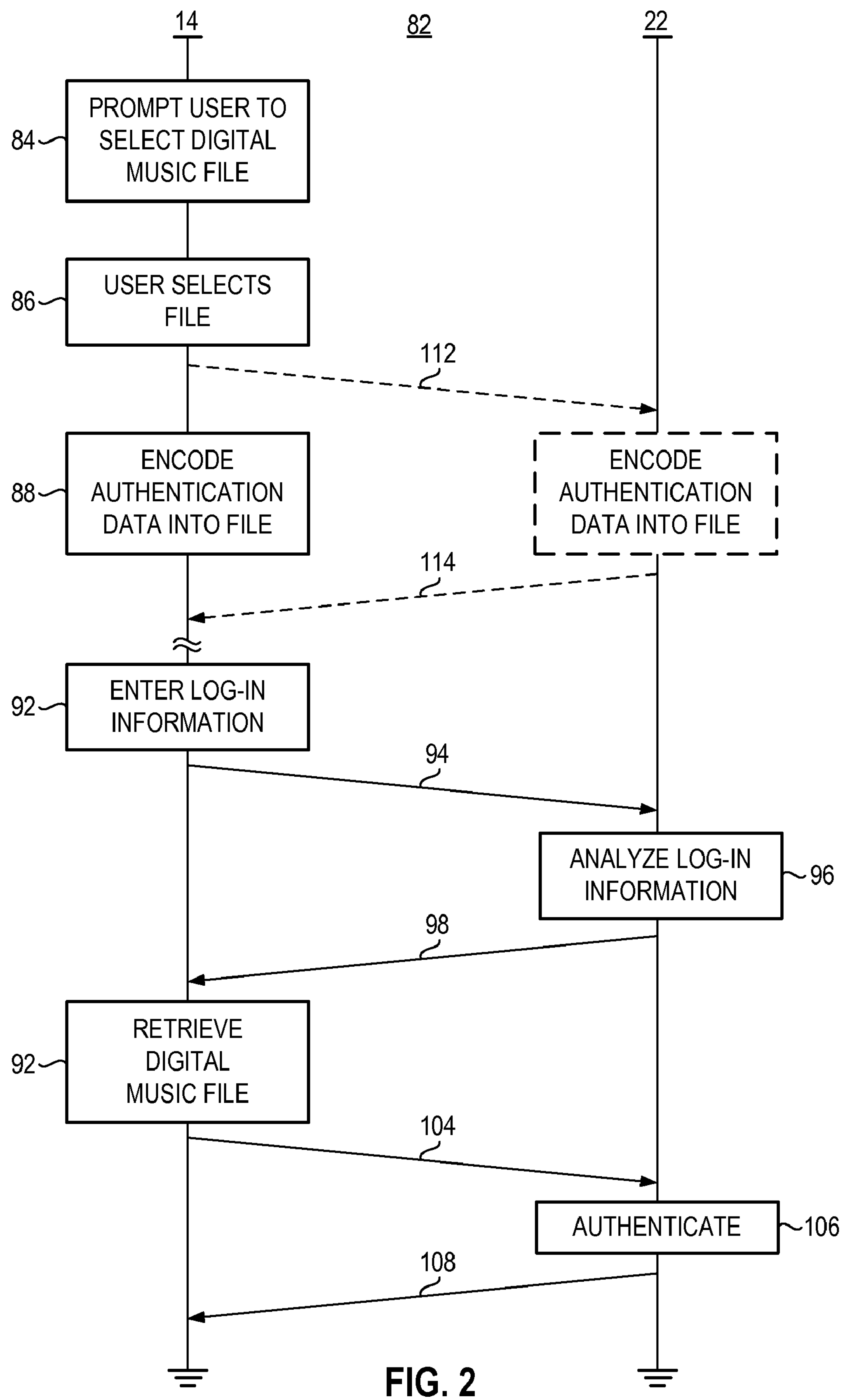
FIG. 2 illustrates a message sequence diagram representative of operation of an embodiment of the present invention.

FIG. 2 illustrates a messaging diagram, shown generally at 82, representative of operation of an embodiment of the present invention. Exemplary operation is represented in terms of the communication device 14 that requests access to a device, such as the server 28 shown in FIG. 1, to whom a request for access is delivered to an authentication server 22. In other configurations and embodiments, analogous operation is carried out pursuant to a request by a user device to access another device.

First, and as indicated by the block 84, a user of the device 14 is prompted to select a digital music file from amongst a plurality of music, and other, content files to be used pursuant to authentication. And, as indicated by the block 86, the user makes a selection of the selected file. Once selected, and as indicated by the block 88, authentication data is encoded into the selected file, and the content file, with the authentication data encoded therein, is stored, made available for subsequent use.

Subsequently, and as indicated by the block 92, when the user elects to attempt to access content of the other device, the user enters log-in information, and the log-in information is sent, indicated by the segment 94 to the authentication server 22. Once delivered to the authentication server, and as indicated by the block 96, the server determines whether the log-in identifies a user permitted access to the requested data or content. And, a response is generated and sent, indicated by the segment 98, in response thereto. Here, the log-in is determined to be acceptable, and the response forms a request for authentication data.

Upon delivery of the authentication data, and as indicated by the block 102, the user of the device retrieves the digital music file that has earlier been selected and into which authentication data has earlier been encoded. Because the digital music, or other, content file is easily remembered by the user, problems associated with user-entry of a string of alphanumeric characters is obviated. Once the selected file has been retrieved, indications contained therein, or the entire content file is sent, indicated by the segment 104. As indicated by the block 106, the authentication server authenticates the requester. If authenticated, an access grant is generated and returned, indicated by the segment 108, and access is granted pursuant to the requested service.

The digital music file forms a digital music token that is used pursuant to the request for access to the remote device. A user supplies log-on credentials, e.g., a user ID and a password. In the event that the digital music token is stored on a portable music player, or other external device, external to the user device, the user is prompted to connect the external device to the computer device. And, the user is prompted for the digital music token. And, the user accesses the digital music token and causes its transmission pursuant to the authentication procedure. The authentication, in one implementation, uses the triplet of information, i.e., the user ID, the password, and a digital music token, pursuant to the authentication. The user is granted access if all of the credentials are validated.

In one implementation, multiple prompts are provided to the user pursuant to generation of the digital music token. The user is prompted to generate, or to update, a music token. The user selects a specific style of music, e.g., classical, jazz, country and western, rock, hard rock, etc. And, once selected, the user is further prompted to choose an artist, composer, or group. And, once selected, the user is prompted to select a specific album of the selected group. The user selects the selected album and then a selected musical work therein. And, using steganographic encryption techniques, authentication data is encoded into that selected musical selection. The encoding is not audible to human hearing. The modified piece of music is then loaded into the memory element of the digital music player for use the next time that authentication is required.

FIG. 2 further illustrates alternate operation in which the encoding of the authentication data is performed at the authentication server, indicated by the block 88'. In this alternate implementation, upon selection of a file at the block 86, the selected file is sent, indicated by the segment 112, shown in dash, to the server 22. The authentication is performed, indicated by the block 88, and the resultant token is returned, indicated by the segment 114, shown in dash.

Figure 3:
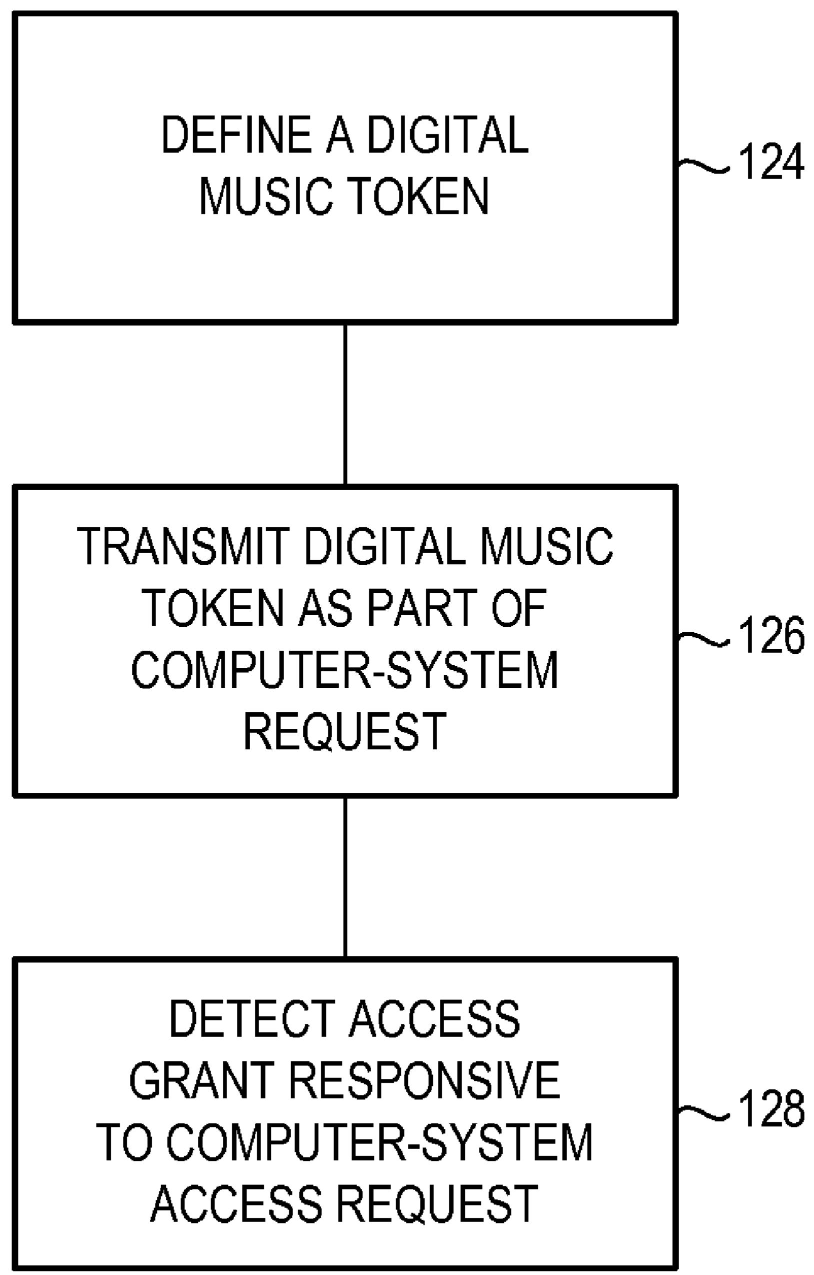
FIG. 3 illustrates a method flow diagram representative of the method of operation of an embodiment of the present invention.

FIG. 3 illustrates a method, shown generally at 122, representative of the method of operation of an embodiment of the present invention. The method facilitates authentication of a user device pursuant to a computer-system access request.

First, and as indicated by the block 124, a digital music token is defined. The digital music token is formed of musical content stored at a memory element that is connectable to the user device. Then, and as indicated by the block 126, the digital music token is transmitted as part of the computer-system access request.

Then, and as indicated by the block 128, an access grant is detected responsive to the computer-system access request.

Thereby, through operation of an embodiment of the present invention, a manner is provided that facilitates authentication of a user, through the user's computer device, to access data of another device. The user need not learn a lengthy string of alphanumeric characters. Rather, the user need only remember the name of a selected music file.

Presently preferred embodiments of the invention and many of its improvements and advantages have been described with a degree of particularity. The description is of preferred examples of implementing the invention and the description of preferred examples is not necessarily intended to limit the scope of the invention. The scope of the invention is defined by the following claims.

What is claimed is:

1. An apparatus for facilitating authentication of a user device pursuant to a computer-system access request, said apparatus comprising:

- a memory element connectable to the user device and configured to store musical content defining a digital music token, wherein the musical content comprises at least part of a selected music track;
- a user-device transmitter configured to transmit the digital music token as part of the computer-system access request; and
- an access grant detector configured to detect an access grant responsive to the computer-system access request that includes the digital music token.

2. The apparatus of claim 1 wherein said memory element comprises a portable memory element, releasably connectable with the user device.

3. The apparatus of claim 2 wherein said portable memory element comprises a portable digital music player.

4. The apparatus of claim 1 wherein said memory element comprises part of digital music player functionality of the user device.

5. The apparatus of claim 1 wherein the musical content further comprises an electronic music file comprising authentication information encoded therein.

6. The apparatus of claim 5 wherein the authentication information encoded into the music file is inaudible when said music file is played.

7. The apparatus of claim 1 further comprising an encoder configured to encode authentication information into the musical content.

8. The apparatus of claim 7 wherein said encoder comprises a steganographer.

9. The apparatus of claim 1 wherein the musical content comprises user-selected musical content.

10. An apparatus for facilitating authentication of a user device pursuant to a computer-system access request, said apparatus comprising:

a memory element connectable to the user device and configured to store musical content defining a digital music token;

a user-device transmitter configured to transmit the digital music token as part of the computer-system access request; and an access grant detector configured to detect an access grant responsive to the computer-system access request that includes the digital music token;

a selector configured to provide for user selection of the musical content that defines the digital music token.

11. The apparatus of claim 1 wherein said user-device transmitter is further configured to transmit a user identification and a password as part of the computer-system access request.

12. A method for facilitating authentication of a user device pursuant to a computer-system access request, said method comprising:

storing a digital music token formed of a digital music file comprising both musical content and authentication information encoded into said musical content, but which is inaudible when said music file is played audibly, said digital music token being stored at a memory element accessible to the user device, wherein the musical content comprises at least part of a selected music track;

transmitting at least the authentication information from the digital music file as part of the computer-system access request; and detecting an access grant responsive to the computer-system access request.

13. The method of claim 12 further comprising encoding the authentication information into the musical content.

14. The method of claim 13 wherein said encoding is performed at the user device.

15. The method of claim 13 wherein said encoding comprises encrypting the authentication information pursuant to a steganographic encryption technique.

16. The method of claim 12 further comprising selecting the musical content to form the digital music token.

17. The method of claim 12 wherein said selecting comprises selecting the musical content from amongst a plurality of music files.

18. The method of claim 17 wherein the music files from which the musical content is selected are stored at a portable digital music player.

19. An apparatus for facilitating user-device authentication to access a computer system, said apparatus comprising:

an authentication token detector configured to receive a digital music file and detect whether said digital music file is a digital music token comprising authentication information encoded into musical content of said digital music file that forms part of a user-device access request, wherein the musical content comprises at least part of a selected music track;

an authenticator to authenticate the user-device access request based on the authentication information extracted from the digital music file; and an access granter configured to grant access responsive to successful authentication by said authenticator.

* * * * *